3,591,360
Patented July 6, 1971

3,591,360
METHOD OF CONTROLLING WEEDS IN SUGAR BEET FIELDS
Frederick H. Vahlsing, Jr., Allentown, N.J., assignor to Vahlsing, Inc.
No Drawing. Filed Aug. 8, 1968, Ser. No. 751,066
Int. Cl. A01n *11/00*
U.S. Cl. 71—65                                6 Claims

ABSTRACT OF THE DISCLOSURE

Weeds in sugar beet fields are defoliated, killed or otherwise arrested, without damage to the sugar beets, by application of an aqueous solution of sodium hydroxide in controlled amounts.

---

Sugar beets are grown in the United States and elsewhere as a raw material source of sugar. As with other agricultural crops, fields of planted sugar beets are subject to growth of undesirable weeds, and in particular, a weed which is known by the common names pig weed, lambs quarter, or goose foot and which botanically is *Chenopodium album*. This weed can grow to heights of five feet and, if unchecked or uncontrolled, can seriously retard the growth of sugar beets.

When this weed reaches advanced maturity, such as five feet height of growth mentioned above, the only practical way to remove it from the sugar beet field is to pull the weed from the ground by hand. The cost of performing such an operation can be from $20 to $30 per acre and is economically prohibitive. There are organic herbicides available on the market which are recommended for control of this weed, but these products are expensive and moreover almost completely ineffective if used after the weed has grown to a height of 8 to 10 inches or more. Hence, the control of *Chenopodium album* in sugar beet fields remains a serious problem. In addition, other weeds frequently grow in sugar beet fields such as mustard and kale plants, although the chief offender and most serious problem is *Chenopodium album*.

It has now been discovered that an aqueous solution of sodium hydroxide has a selective herbicidal action against *Chenopodium album* without harmful or damaging effect upon sugar beets, when the solution is applied in control amounts. This discovery provides a method for arresting *Chenopodium album* in sugar beet fields with tremendous effectiveness and at substantial economic savings. Specifically, the conventional organic herbicides which are recommended for control of this weed usually are sold at a price of approximately $5 per pound, whereas sodium hydroxide can be purchased at 10¢ per pound. This difference represents a very substantial saving in overhead costs in the cultivation and harvesting of sugar beets.

The fact that sodium hydroxide in aqueous solution has a selective herbicidal action against *Chenopodium album* but not against sugar beets is contrary to the general knowledge in the art that inorganic herbicides almost always have a general effect rather than a selective effect. Such inorganic herbicides have heretofore been used almost exclusively in applications where destruction of all plant growth has been desired and where the general killing action of the herbicides therefore could be put to advantageous use. Contrary to this general herbicidal action, sodium hydroxide has been proved to be capable of selectively attacking *Chenopodium album* without deleterious effect upon sugar beets and because of this selective action, sodium hydroxide has tremendous advantage and utility as a herbicide for sugar beet farmers.

When the sodium hydroxide solution is applied to sugar beet fields, its herbicidal action towards *Chenopodium album* is manifested within 7 to 9 hours after application. This action is manifested by the browning or blackening of the foliage on the weed resulting in shriveling, drying, cessation of growth, or complete destruction, whereby the weed no longer can adversely affect the sugar beets. These manifestations of herbicidal action may be experienced in varying degrees and number in the same or different instances of application of sodium hydroxide. However, in all cases, the sodium hydroxide is effective to prevent further interference with sugar beet growth by *Chenopodium album*. Therefore, as used in this specification and claims, reference to "arresting" of *Chenopodium album* or other weeds signifies the defoliation, killing, stunting or other control effect over the weed as described above, so as to eliminate it's interference with the growth of sugar beets.

In practicing the invention, the most convenient way of applying the sodium hydroxide solution to sugar beet fields is to spray the solution from an elevated position down upon the foliage of the weeds and sugar beets growing in the field. For example, aircraft, sprayer trucks or tractors or tractor attachments used conventionally to spray liquids down upon cultivated fields may be used. The sodium hydroxide solution may also be applied through irrigation pipes and hoses, particularly those which discharge a spray of liquid upwardly from ground position.

As to amounts and concentrations, it has been determined that an aqueous solution containing from about 1% to about 5% by weight of sodium hydroxide applied in the amounts of about 50 to about 70 gallons per acre of sugar beet field will give effective results in arresting *Chenopodium album*. Such applied amounts of sodium hydroxide solution are equivalent to application of from about 4 to about 30 pounds of solid sodium hydroxide per acre of sugar beet field. If the applied amounts are increased above those stated, the sodium hydroxide solution begins to exhibit a harmful effect upon the sugar beets, and if the applied amounts are lower than the amounts stated above, then only a small arresting effect will be achieved upon the weeds. The best results have been achieved by applying an aqueous solution containing 2½% by weight of sodium hydroxide in the amount of about 60 gallons per acre of sugar beet field.

The following description is given as a specific embodiment of the control method of the invention. A potato sprayer tractor apparatus having two spray booms extending out from opposite sides of the tractor was filled with 300 gallons total of an aqueous solution containing 2½% by weight of sodium hydroxide. The solution was sprayed uniformly with this apparatus over 5 acres of sugar beet fields having a growth of *Chenopodium album* approximately 5 feet tall. Eight to nine hours later the foliage of the *Chenopodium album* had turned to a brown-black color and had shriveled and dried up. Thereafter, no further growth of the *Chenopodium album* was noted whereas the sugar beets were not damaged or deleteriously affected and continued to thrive and grow.

The invention has now been described in terms of its operating principles and a specific embodiment thereof. Various obvious changes or modifications can be made in the foregoing description without departing from the invention. For example, the effective concentrations and amounts of sodium hydroxide stated above have been derived from experience with sugar beet growth in Maine. However, in other geographical locations, changes in the specific concentrations and amounts of sodium hydroxide may be effective in the manner of the invention because of the correspondingly different environmental factors or conditions that could be encountered in such locations. In all cases, it is merely necessary for practicing the invention to apply concentrations and amounts of sodium hydroxide solution which will arrest *Chenopodium album* without damaging or deleteriously affecting the sugar beets in the field where the solution is applied.

Accordingly it will be understood that it is intended to cover all changes and modifications of the preferred embodiments of the invention, herein chosen for the purpose of illustration, which do not constitute departures from the spirit and scope of the invention.

What is claimed is:

1. A method of controlling chenopodium in a sugar beet field which comprises applying to said field an aqueous solution of sodium hydroxide in an amount effective to arrest said weeds without damaging said sugar beets.

2. A method as in claim 1 wherein said aqueous solution contains from about 1% to about 5% by weight of sodium hydroxide.

3. A method as in claim 2 wherein said solution is applied in the amount of about 50 to about 70 gallons of solution per acre of field.

4. A method as in claim 1 wherein said solution is applied by spraying the solution from an elevated position down upon the foliage of said weeds and sugar beets.

5. A method as in claim 1 wherein said solution contains about 2½% by weight of sodium hydroxide and is applied in the amount of about 60 gallons per acre of field.

6. A method of controlling *Chenopodium album* in a sugar beet field which comprises applying to said field from about 50 to about 70 gallons per acre of an aqueous solution containing from about 1% to about 5% by weight of sodium hydroxide.

References Cited

Milles, "Herbicide and Lime Fertilizer," Chem. Abs., vol. 55, 9772g (1961).

Konniri et al. "Combatting Ambrosia by Chemical Means," Chem. Abs., vol. 49, 9862d (1955).

LEWIS GOTTS, Primary Examiner

C. L. MILLS, Assistant Examiner

U.S. Cl. X.R.

71—69, 76